US011967207B2

(12) United States Patent
Riccobon

(10) Patent No.: US 11,967,207 B2
(45) **Date of Patent: *Apr. 23, 2024**

(54) SECURE POKER GAMING METHODS AND SYSTEMS

(71) Applicant: Franco Mario Riccobon, Coral Gables, FL (US)

(72) Inventor: Franco Mario Riccobon, Coral Gables, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,464

(22) Filed: Mar. 7, 2023

(65) Prior Publication Data

US 2023/0334940 A1 Oct. 19, 2023

Related U.S. Application Data

(63) Continuation of application No. 17/548,488, filed on Dec. 10, 2021, now Pat. No. 11,600,142.

(60) Provisional application No. 63/232,634, filed on Aug. 12, 2021, provisional application No. 63/123,953, filed on Dec. 10, 2020.

(51) Int. Cl.
*G07F 17/32* (2006.01)

(52) U.S. Cl.
CPC ...... *G07F 17/3241* (2013.01); *G07F 17/3293* (2013.01)

(58) Field of Classification Search
CPC ... G07F 17/3241; G07F 17/3293; G07F 17/32
USPC ................................................ 463/13, 12, 11
See application file for complete search history.

(56) References Cited

U.S. PATENT DOCUMENTS

| | | | | |
|---|---|---|---|---|
| 10,832,531 | B2 * | 11/2020 | Pertgen | G07F 17/3225 |
| 11,170,606 | B1 * | 11/2021 | Chau | G07F 17/3225 |
| 2006/0246984 | A1 * | 11/2006 | Walker | G07F 17/3241<br>463/16 |
| 2010/0093429 | A1 * | 4/2010 | Mattice | G07F 17/3232<br>463/25 |
| 2021/0125462 | A1 * | 4/2021 | Pertgen | G07F 17/3293 |
| 2022/0068084 | A1 * | 3/2022 | Chau | G07F 17/3258 |

* cited by examiner

*Primary Examiner* — Pierre E Elisca
(74) *Attorney, Agent, or Firm* — Newman Law, LLC

(57) ABSTRACT

Systems and methods of providing secure wagering gaming operations involving randomly generating a plurality of playing card values as player hands, a dealer hand and a community group, and distributing a payout responsive to the best possible poker ranking achievable from final hands formed of only specific number of cards in the each of the respective player hands and dealer hand, and community group.

5 Claims, 8 Drawing Sheets

SECURE POKER GAMING METHODS AND SYSTEMS

BACKGROUND OF THE INVENTION

Field of the Invention

The present invention relates to the field of gaming, particularly to the field of wagering games involving real or virtual playing cards, and more particularly to wagering games having multiple wagering opportunities and enhanced payout awards responsive to satisfaction of a preset criteria.

Background of the Art

Poker has enjoyed an increase in popularity in recent years, and a variety of modified poker games have arisen to provide players with desired levels of action, complexity, and ease of play.

For example, Texas Hold'em is a very popular variety of community card poker. In Texas Hold'em, each player receives two pocket cards. A round of betting occurs after the pocket cards are dealt, followed by the display of three community cards, called the "flop." A second round of betting occurs, followed by the display of a fourth community card, called the "turn," or "fourth street." A third round of betting then occurs, followed by the display of a fifth community card, called the "river" or "fifth street." A final round of betting occurs, after which the players determine the winner, in a process called the "showdown." The winner is the player among the players remaining in the game who has the highest ranked hand formed from any of the player's pocket cards and the community cards. The winner receives all the accumulated bets in the pot. Since there are two pocket cards available to each player, and only five community cards, it is likely that the highest ranked hand will utilize pocket cards, and the chances for a tie hand are relatively less than in a game with fewer pocket cards and more community cards. Additionally, since a full hand of five cards is available after the first round of betting, players will be likely to fold if they fail to make a ranked hand when the first three community cards are dealt.

Some poker-based games have been modified to be "casino games" in which players do not compete against one another but rather compete against the house, that is, a dealer hand or otherwise place wagers on whether an outcome will be achieved in comparison to a paytable listing rankings and payouts based on the cards that form the player's respective hand, or both.

Players seek new and interesting wagering games to play, whether online or at a casino, while casino operators, both physical and virtual, wish to attract players to their establishments or websites by providing players with opportunities to play new and interesting wagering games. Accordingly, there is continual interest in new and interesting wagering games, particularly those which employ some of the elements found in poker.

SUMMARY OF THE INVENTION

Some embodiments of the invention are directed to systems and methods which enable secure wagering gaming operations through a computerized platform, the computerized platform comprising one or more of each of a data storage device, a processor, a display device, a random number generator and a data communication device, the processor being configured to execute code stored in the data storage device to enable the computerized platform to: detect receipt through the data communication device of a wager received as credit from a player account; responsive to detecting receipt of the wager, initiate a single round of play randomly generate card values for a player hand, a dealer hand and a community group; conduct one or more game events, wherein in each of the one or more game events a portion of card values in the community group are displayed and an additional wager may be received as credit from the player account; determine the best possible ranked final player hand, the final player hand being formed from a first preset number of card values in the player hand and a second preset number of card values from the displayed community group; determine the best possible ranked final dealer hand, the final dealer hand being formed from the first preset number of card values in the dealer hand and the second preset number of card values from the displayed community group; and distribute a payout to the player account responsive to the processor determining the final player hand outranking the final dealer hand.

As discussed herein, the invention is generally directed to systems and methods of providing, hosting and playing a wagering game in which each player places at least one game wager to participate, playing cards from a random source of cards are distributed to form a partial player hand for each participating player, a partial dealer or house hand and a community group, whereby, such as in Omaha poker, a final player hand rank for each participating player is determined as the best poker rank possible from the final player hand consisting of a limited group of the cards in the player's partial player hand and the cards in the community group, and a final dealer hand rank is determined as the best poker rank possible from the final dealer hand consisting of a limited group of the cards in the partial dealer hand and the cards in the community group. In this embodiment all cards are dealt face-down or otherwise not revealed, other than players may view their partial player hand.

The final outcome of a round of play involves revealing all cards to determine the best poker rank of the final hands. A part of the game wager placed is settled as a win for the player responsive to the final player hand rank outranking the final dealer hand rank and another part of the wager is settled as a win for the player responsive to the final player hand rank being a preset rank on a paytable listing ranks only if the final player hand rank outranks the final dealer hand rank.

In some embodiments, the player and dealer partial hands consist of four cards. In some embodiments, the limited group of cards used in forming the final player and final dealer hands is two cards.

In some embodiments, the community group of cards consists of five cards. In some embodiments, the community group is dealt in at least two events, wherein each event involves the dealing of a partial amount of the community group. In some embodiments, at each event a player may place an additional wager or take no action. In some embodiments, placing an additional wager by the final event is mandatory to determine the final outcome of the round of play.

In some embodiments, players may place side wagers on the rank achieved by the partial player and/or dealer hand. In some embodiments, players may place side wagers on the rank achieved by the final player and/or final dealer hand.

In some embodiments, the final dealer hand rank must be at least a qualifying rank or higher, or the game wager pushes. In some embodiments, a tie between the final dealer hand rank and final player hand rank is a push, whereas in other embodiments a tie is a loss.

In some embodiments, the partial player hand is at least two cards.

In some embodiments, the community group is three or more cards.

In some embodiments, the partial player hand and partial dealer hand includes four cards each and the community group includes five cards. The limited group of cards that can be used in the partial player and partial dealer hand is two, respectively. Thus, both the final player hand rank and final dealer hand rank will be formed of two of the four cards in the partial hands and three of the five cards in the community group. All hands are formed to achieve the best poker rank possible.

In some embodiments, the game wager is received as a two part wager, wherein the first part of the game wager is an ante wager that has a winning outcome responsive to the final player hand rank outranking the final dealer hand rank and the second part of the game wager has a winning outcome responsive to the final player hand outranking the final dealer hand, wherein a payout award for the second part of the game wager is determined based on the rank of the final player hand. A losing outcome is the final dealer hand rank outranking the final player hand rank.

In some embodiments, an additional call wager may be placed prior to the determination of a winning or losing outcome. In one aspect, the call wager may be placed prior to the player viewing all or part of the community group of cards or after the player views the community group of cards.

In some embodiments, the amount of the call wager that can be received is limited, and the limit is highest after the player's partial hand is dealt. The limit may thereafter be decreased as or after the player views at least some of the community group of a cards. In some embodiments, the community cards are revealed in at least two events. For example, in the case of five community cards, three cards may be revealed in a first event to enable players that have not already placed a call wager to then place a call wager before the final two cards are revealed and final player and dealer hand ranks are determined. In some embodiments, players that do not place a call wager forfeit the round or some or all of any wagers placed.

In some embodiments, the final dealer hand must first qualify by achieving at least a qualifying poker rank, such as a pair of Tens, prior to competing against the final player hand rank. The ante, bonus and/or call wager may push or win responsive to the final dealer hand failing to qualify. Any losing ante, bonus and/or call wagers are collected. In some embodiments, should the final player hand rank and final dealer hand rank be the same, the ante, bonus and call wagers may all push, or in other embodiments lose.

In some embodiments, a side wager may be placed and received, wherein the outcome of the side wager is determined based on the partial and/or final player hand, partial and/or final dealer hand, or community group of cards being of one or more specific ranks. In some embodiments, the payout amount distributed for a winning side wager is based on the specific rank. Any losing side wagers are collected.

BRIEF DESCRIPTION OF THE DRAWINGS

While the disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION OF THE INVENTION

Figure 1:
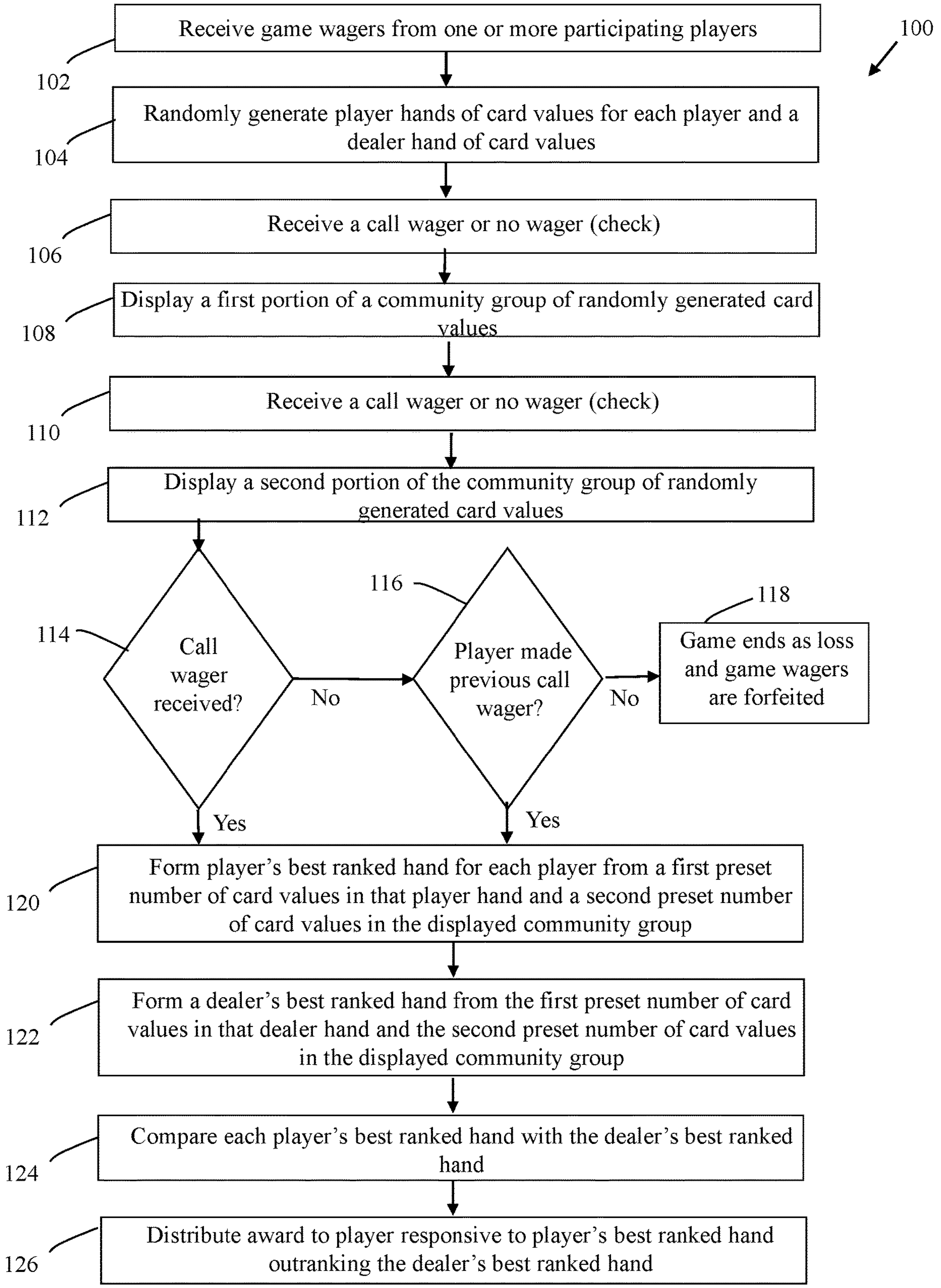
FIGS. 1-2 describe exemplary gaming systems and methods configured and constructed according to various embodiments of the invention.
Figure 2:
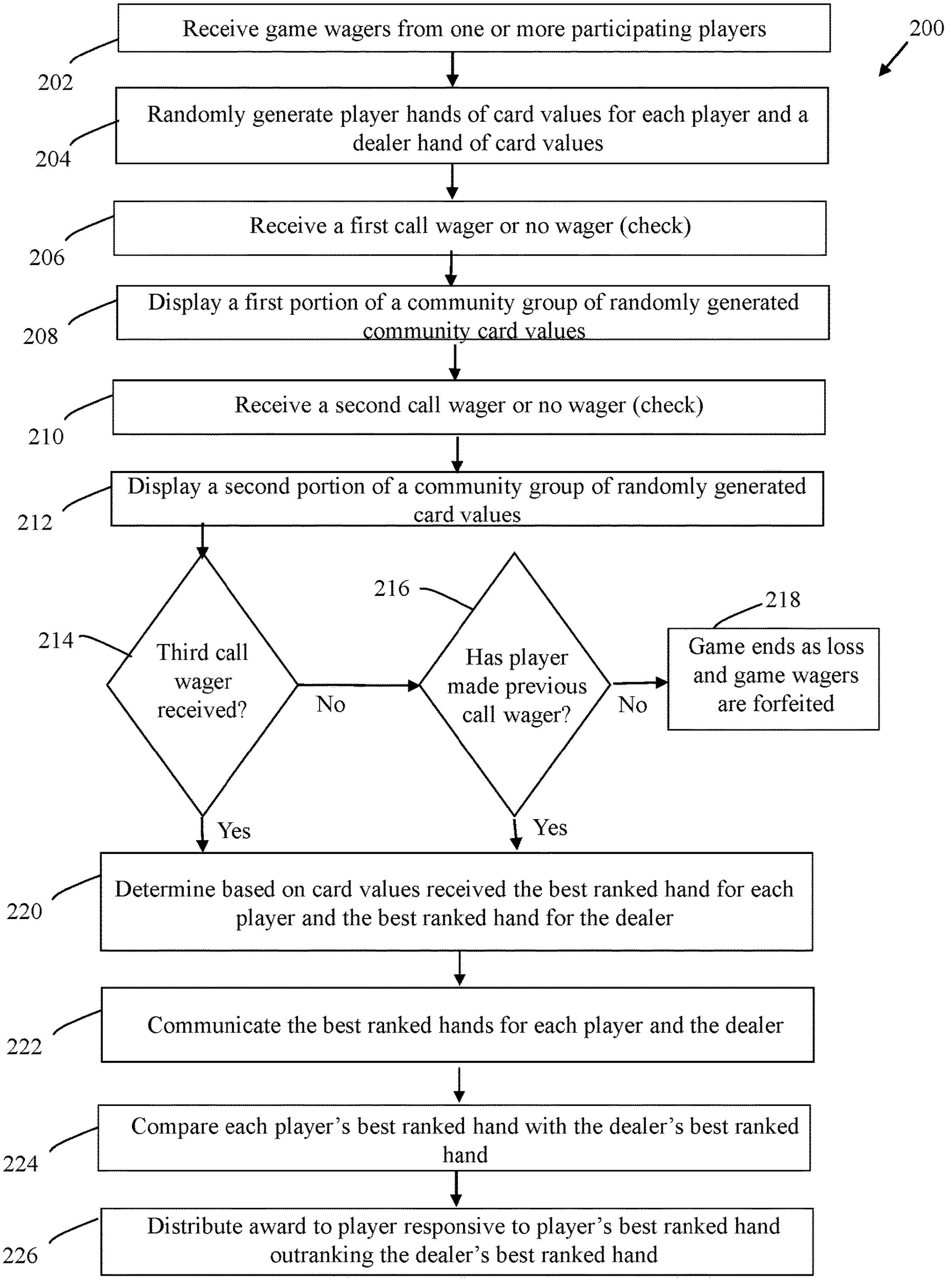

The invention is directed to systems and methods of providing, hosting and enabling play of wagering game technology, and in particular, secure wagering gaming in which each gaming operator securely receives a game wager to participate in a wagering game, actuates a specialized source of randomly generated playing card results which is in some embodiments enabled to identify card values forming a player hand for each participating player (that is, a participating player is an individual from which a game wager is received) a house or dealer hand and a community group, such as for example, a card shuffling device or shoe with a card identifying reader, a random number generator configured to generate numbers which are assigned by a processing device to a card result from playing card information stored in a memory, or a video streaming service which is used to transmit playing card results to a remote device or terminal. In some embodiments, a portion of the randomly generated playing card values in the player and/or dealer hand or none the cards are displayed, whereas none of the community group of card values are displayed upon being provided.

In some embodiments, the specialized source of random playing card values is an element a specialized gaming table which includes player positions and a dealer position, and may further include bet sensors. In some embodiments, the specialized source of random playing cards is in communication with a communication device, such as a display device, for determining the best possible hand rank achievable for each player hand and the dealer hand and communicating the ranks, such as by displaying the highest rank achievable for each player hand and the dealer hand on the display device. The specialized gaming table may further determine and display the outcome of any wagers received based on the hand rank outcomes, and in particular, whether or not the player hand outranks the dealer hand, or vice versa.

In some embodiments, the hand rank for each player hand is based on the card values from a first preset number of the card values forming the player hand and a second preset number of card values from the card values forming the community group, and for the dealer hand, and wherein the hand rank for the dealer hand is based on the first preset number of the card values forming the dealer hand and the second preset number of card values forming the community group. In the embodiments discussed herein the ranks are based on poker ranks.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers generally refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art following the disclosure provided herein, the present invention can be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized, including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.) The computer program code, however, for carrying out operations of the present invention may also be written in conventional procedural programming languages, such as the "C" programming language or in a visually oriented programming environment, such as, for example, VisualBasic. The program code may execute entirely on the user's computer, partly on the user's computer, as a stand-alone software package, partly on the user's computer and partly on a remote computer or entirely on the remote computer.

A remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider). A user's computer can include a portable electronic device, such as a smartphone or tablet computer, that can communicate wirelessly over data communications networks.

Authentication can include the use of user names, passcodes, biometrics, device identification, Portable electronic device location can also be determined based on GPS or via network communication. Authentication can also include the determination of a user's location based on the location of the user's portable electronic device.

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates an exemplary embodiment of the invention generally designated by the reference numeral 100.

In step 102, a wager is received, which is referred to herein as a game wager, but may include multiple parts, such as an ante and a blind wager, having outcomes based on different preset criterion from the game play results.

In some embodiments, the placement of the game wager on a display submits the game wager. A display as used herein includes displays such as virtual displays, three-dimensional displays, table layout displays and electronic displays. Accordingly, the receipt of the game wager is accomplished by the movement of an item into a designated position on the display, which is then verified independently as being in position, such as by the confirmation of the position of the game wager on the display by an independent recording, video or image capture device. The receipt of the wager may also correspond with the deduction of the amount of the game wager from a stored a credit balance.

As shown in step 104, card values are randomly generated to form a player hand for each player and a dealer hand. The card values may be in the form of cards distributed from a source of random cards to form a player hand for each participating player and a dealer hand. The source may be a shuffler, card shoe or virtual cards provided on a display with the assistance of a random number generator. In some embodiments, four card values are randomly generated for each player hand and the dealer hand.

In some embodiments of the invention, each player may view one or more cards forming their respective player hand but not the dealer hand. A community group of card values may also be randomly generated in this step in some embodiments but the card values will remain unrevealed.

As shown in step 106, players may make an additional or "call" wager or make no wager, that is, players may "check" rather than wager. In some embodiments, after viewing one or more cards in the player hand, each player must place the additional wager to avoid forfeiting the game wager and remain in the round of the game. In this embodiment, the additional call wager is optional in steps 106 and 110, but not optional in step 114. In some embodiments, players may only make one call wager during a round of the game, that is, only one call wager may be received over steps 106, 110 and 114. The additional wager may be the same as the game wager or different, such as a multiple of the game wager or if the game wager is a multi-part wager, then a multiple of a part thereof. In some embodiments, the possible maximum amount of the call wager, or multiple, is greater in step 106 than in steps 110 or 114.

As shown in step 108, the card values of a first portion of a community group of randomly generated card values is displayed. In some embodiments, three card values from the community group are displayed.

As shown in step 110, once again a call wager or no wager is received. As shown in step 112, a second portion of the card values in the community group is displayed. In some embodiments, two card values from the community group are displayed.

As shown in steps 114 and 116, if the call wager is not received in step 114 and a call wager was not previously received, then in step 118 the game ends and the game wager is lost.

If the call wager is received in step 114 or previously received, then as indicated by steps 114, 116 and step 120, a final player's hand is formed for each player from a first preset number of card values in the player hand received in step 104 and a second preset number of card values in the community group. The card values are selected to achieve the best possible rank. In embodiments where the player hand is four card values and the community group is five card values, then the first preset number is two and the second preset number is three.

In step 122 a final dealer's hand is formed for each dealer from the first preset number of card values in the dealer hand received in step 104 and a second preset number of card values in the community group. In embodiments where the dealer hand is four card values and the community group is five card values, then the first preset number is two and the second preset number is three.

In step 124, each player's best ranked hand is compared with the dealer's best ranked hand and an award is distributed per step 126 responsive to the player's best ranked hand outranking the dealer's best ranked hand and based on the game wager received. In some embodiments, the dealer hand must achieve at least a qualifying dealer hand rank for all wagers to be settled based on a comparison of rankings. If the dealer hand is not at least the qualifying rank or greater then some or all of the game and/or call wagers may push, that is, be returned.

In some embodiments, side wagers may be placed based on the satisfaction of certain preset criteria. For example, a side wager may be placed on the cards in the player hand, dealer hand, community group, such as either or all forming at least specific poker ranks or compared with a paytable.

Some embodiments of the invention are directed to a systems and methods of providing a wagering game through a computerized platform, such as those discussed herein, which include one or more data storage devices, processors, display devices, random number generators and data communication devices, the processor being configured to execute code stored in one or more of the data storage devices to detect receipt of one or more wagers received and a selection of high or low from each participating player, actuate the random number generator to randomly generate a player hand for each participating player and a dealer hand, the processor facilitating the execution of steps shown in FIG. 1.

Figure 3:
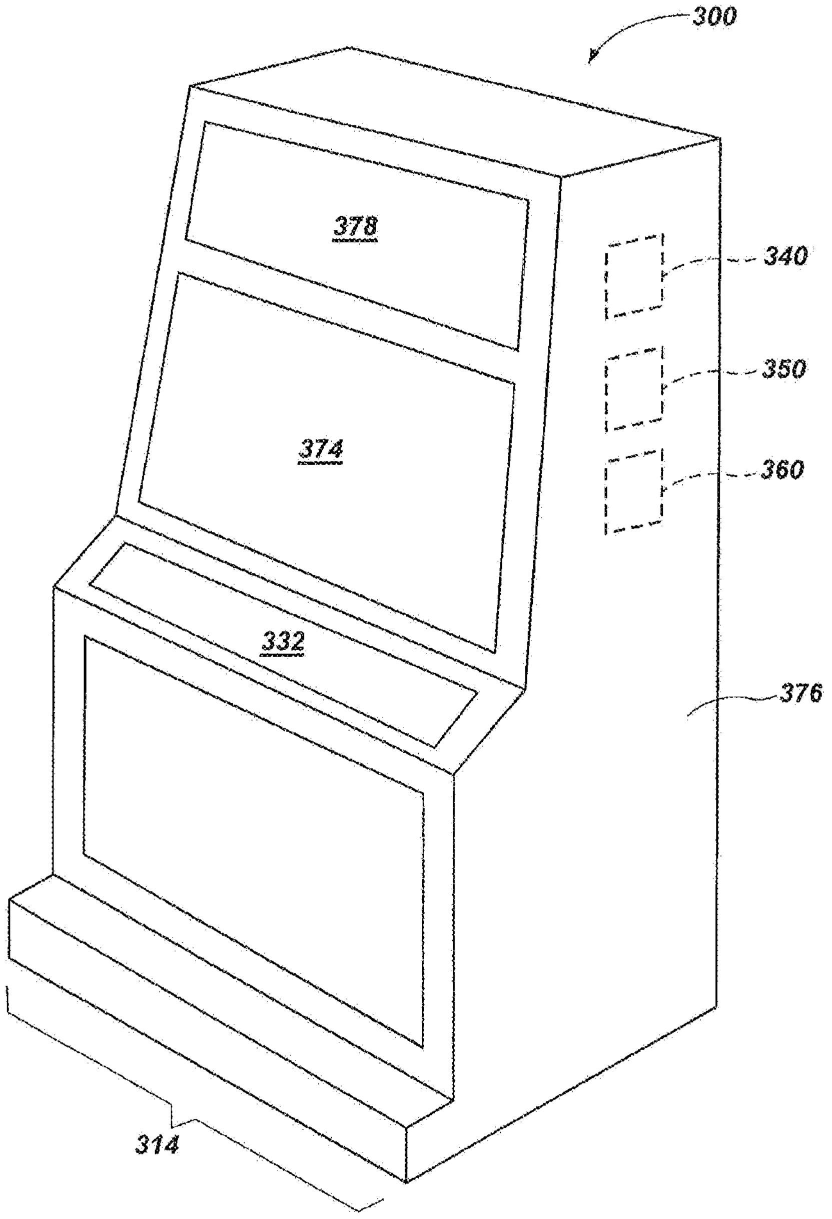
FIG. 3 is a perspective view of an individual electronic gaming device configured for implementation of embodiments of wagering games in accordance with this disclosure.

FIG. 3 illustrates an exemplary embodiment of the invention generally designated by the reference number 200 involving a system and method including a device for reading playing cards and determining intermediary and/or final game results, such as the player hand and/or dealer hand, as shown particularly by steps 220 and 222, such that for enhanced game security, integrity and automation, among other reasons, the dealer or similar personnel receives instructions or other information that facilitates the administration of a round of the game by, among other things, displaying on a display device instructions for forming or determining the best possible rank of the player hand and the dealer hand using the first preset number of cards from each and second preset number of cards from the community group, and comparing the ranks or other playing card and hand information for the purpose of determining the outcome of wagers placed in steps 224 and 226. In some embodiments, a display device is mounted in a gaming table surface and connected with a shuffler or card shoe device with a card reader. The card reader communicates the identity of each playing card and is in communication with a player position detection device or dealer input device for receiving player information so that the number of players in the round is known. A processing device and memory storing game information is then able to determine all hands in the game as well as display to the dealer the correct way to set the dealer hand for purposes of comparing the dealer hand with each player hand and resolve the wagers in the game. Since all cards are read as they are dealt, including any face down cards, and the system is able to determine the hands receiving each card, the system may also be configured to determine the outcome of all wagers in the round after the deal is complete, including wagers which are normally not resolved until all cards being revealed.

Some embodiments of the invention are directed to a systems and methods of providing a wagering game through a computerized platform including one or more data storage devices, processors, display devices, random number generators and data communication devices, the processor being configured to execute code stored in one or more of the data storage devices to detect receipt of one or more wagers received, actuate the random number generator to randomly generate a partial player hand for each participating player, a partial dealer hand and a community group, the processor determining a final player hand rank from the randomly generated cards in a limited group of the player's partial player hand and the community group, and a final dealer hand rank from the randomly generated cards in a limited group of the partial dealer hand and the community group, wherein the processor facilitates distribution of an award to the player responsive to the processor determining that the final player hand rank is higher than the final dealer hand rank.

In some embodiments the wagering game is conducted using physical playing cards drawn from a randomly ordered group of standard physical playing cards, such as a single deck of playing cards. In other embodiments, the wagering game is conducted by using a random number generator mapped to simulate one or more decks of randomized standard physical playing cards.

In some embodiments the placement of a wager comprises physically placing an implement representing a monetary amount in a designated area on a gaming table surface, the loss and collection of the wager comprises physically removing the implement received from the designated area on the gaming table surface, and the distribution of a payout to the player comprises placing physical implements representing monetary amounts in the designated area of the gaming table surface.

In some embodiments, the system and method employ a device for reading playing cards and determining intermediary and/or final game results, such as the player hand and/or dealer hand, such that the dealer or similar personnel may receive instructions or other information that facilitates the administration of a round of the game by, among other things, displaying on a display device instructions for forming or determining the rank of the player hand, the dealer hand, and comparing the ranks or other playing card and hand information for the purpose of determining the outcome of wagers placed. In some embodiments, a display device is mounted in a gaming table surface and connected with a shuffler or card shoe device with a card reader. The card reader communicates the identity of each playing card and is in communication with a player position detection device or dealer input device for receiving player information so that the number of players in the round is known. A processing device and memory storing game information is then able to determine all hands in the game as well as display to the dealer the correct way to set the dealer hand for purposes of comparing the dealer hand with each player hand and resolve the wagers in the game. Since all cards are read as they are dealt, including any face down cards, and the system is able to determine the hands receiving each card, the system may also be configured to determine the outcome of all wagers in the round after the deal is complete, including wagers which are normally not resolved until all cards being revealed.

Some embodiments of the invention are directed to systems for providing the above methods, which may include one or more data communication devices, display devices, and processing devices, which may be local or remote, as necessary to provide these methods on any computerized or partially computerized platforms, online or through a local or global communication network, including mobile devices, home computers, single or multiplayer electronic gaming machines enabling play with virtual or real currency and/or virtual or real playing cards, devices or kiosks for enabling wagering on the play of a live wagering game of the invention.

Some embodiments of the invention are also directed to a non-transitory machine readable media for providing a wagering game including one or more software programs, code and/or data segments as necessary to provide any of the methods described herein on one or more machines.

It should be understood that the words "wager," "wagering," "betting" or "bet," or the like, refers to any type of points, money, credits, items of value, including physical or virtual representations thereof, which are placed at stake in that they may be forfeit depending on the occurrence of machine-generated randomly generated outcomes, such as outcomes which may be provided by revealing physical playing cards drawn from one or more decks or groups of randomly-ordered physical playing cards or a random number generator for randomly generating numbers which can be mapped to identify playing card results.

Various platforms are contemplated that are suitable for implementation of embodiments of wagering games according to this disclosure. For example, embodiments of wagering games may be implemented as live table games with an in-person dealer, electronic gaming machines, partially or fully automated table games, and fully automated, network-administered games (e.g., Internet games) that either produce game results utilizing a processor, or produce a live video feed of a dealer administering a game from a remote studio.

As previously noted, any of the present methods and games may be played as a live casino game, as a hybrid casino game (with real or virtual cards), on a multi-player electronic platform, on a personal computer for practice, on a hand-held game for practice, on a legally-authorized site on the Internet, or on a play-for-fun site on the Internet, or through any other communication network.

For example, in one embodiment, the players may be remotely located from a live dealer, and a live dealer and a game table may be displayed to players on their monitors via a video feed. The players' video feeds may be transmitted to the dealer and may also be shared among the players at the table. In a sample embodiment, a central station may include a plurality of betting-type game devices and an electronic camera for each game device. A plurality of player stations, remotely located with respect to the central station, may each include a monitor, for displaying a selected game device at the central station, and input means, for selecting a game device and for placing a bet by a player at the player's station relating to an action involving an element of chance to occur at the selected game device.

FIG. 3 is a perspective view of an individual electronic gaming device 300 (e.g., an electronic gaming machine (EGM)) configured for implementing wagering games according to this disclosure. The individual electronic gaming device 300 may include an individual player position 314 including a player input area 332 configured to enable a player to interact with the individual electronic gaming device 300 through various input devices (e.g., buttons, levers, touchscreens). The individual electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, chips or other wagering elements, and live personnel. The action may instead be simulated by a control processor 350 operably coupled to the memory 340 and interacting with and controlling the individual electronic gaming device 300.

Figure 4:
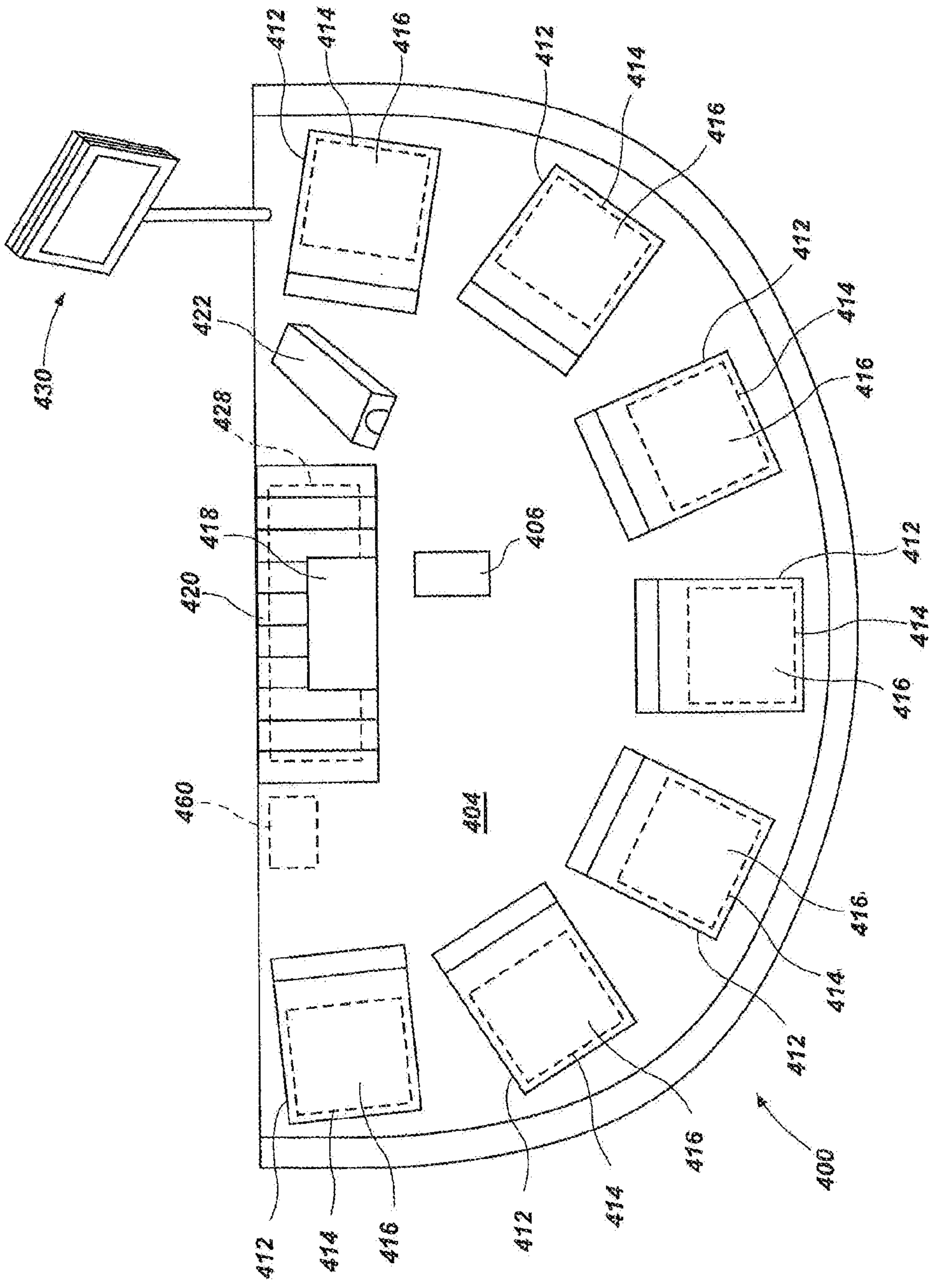
FIG. 4 is a top view of a table configured for implementation of embodiments of wagering games in accordance with this disclosure.

Although the individual electronic gaming device 300 displayed in FIG. 4 has an outline of a traditional gaming cabinet, the individual electronic gaming device 300 may be implemented in other ways, such as, for example, client software downloaded to a portable device, such as a smart phone, tablet, or laptop computer. The individual electronic gaming device 300 may also be a non-portable personal computer (e.g., a desktop or all-in-one computer) or other computing device. In some embodiments, client software is not downloaded but is native to the device or is otherwise delivered with the device when distributed.

A communication device 360 may be included and operably coupled to the processor 350 such that information related to operation of the individual electronic gaming device 300, information related to the game play, or combinations thereof may be communicated between the individual electronic gaming device 300 and other devices such as a server through a suitable communication medium, such, as, for example, wired networks, Wi-Fi networks, and cellular communication networks.

The gaming screen 374 may be carried by a generally vertically extending cabinet 376 of the individual electronic gaming device 300. The individual electronic gaming device 300 may further include banners to communicate rules of game play and the like, such as along a top portion 378 of the cabinet 376 of the individual electronic gaming device 300. The individual electronic gaming device 300 may further include additional decorative lights (not shown), and speakers (not shown) for transmitting and optionally receiving sounds during game play.

Some embodiments may be implemented at locations including a plurality of player stations. Such player stations may include an electronic display screen for display of game information according to the invention (e.g., cards, wagers, and game instructions) and for accepting wagers and facilitating credit balance adjustments. Such player stations may, optionally, be integrated in a table format, may be distributed throughout a casino or other gaming site, or may include both grouped and distributed player stations.

FIG. 4 is a top view of a suitable table 400 configured for implementing wagering games according to this disclosure. The table 400 may include a playing surface 404. The table 400 may include player stations 412. Each player station 412 may include a player interface 416, which may be used for displaying game information (e.g., game instructions, input options, wager information, game outcomes, etc., and accepting player elections). The player interface 416 may be a display screen in the form of a touch screen, which may be at least substantially flush with the playing surface 404 in some embodiments. Each player interface 416 may be operated by its own local game processor 414 (shown in dashed lines), although, in some embodiments, a central game processor 428 (shown in dashed lines) may be employed and may communicate directly with player interfaces 416. In some embodiments, a combination of individual local game processors 414 and the central game processor 428 may be employed.

A communication device 460 may be included and may be operably coupled to one or more of the local game processors 414, the central game processor 428, or combinations thereof, such that information related to operation of the table 400, information related to the game play, or combinations thereof may be communicated between the table 400 and other devices through a suitable communication medium, such as, for example, wired networks, Wi-Fi networks, and cellular communication networks.

Table 400 may further include additional features, such as a dealer chip tray 420, which may be used by the dealer to cash players in and out of the wagering game, whereas wagers and balance adjustments during game play may be performed using, for example, virtual chips (e.g., images or text representing wagers). For embodiments using physical cards, the table 400 may further include a card-handling device 422 (which may be configured to shuffle, read, and deliver physical cards for the dealer and players to use during game play or, alternatively, a card shoe configured to read and deliver cards that have already been randomized) and a designated area for physical cards 406, which may include locations for a dealer's hand. For embodiments using virtual cards, the virtual cards may be displayed at the individual player interfaces 416.

The table 400 may further include a dealer interface 418, which, like the player interfaces 416, may include touch screen controls for receiving dealer inputs and for assisting the dealer in administering the wagering game. The table 400 may further include an upright display 430 configured to display images that depict game information such as pay tables, hand counts, historical win/loss information by player, and a wide variety of other information considered useful to the players.

Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 5:
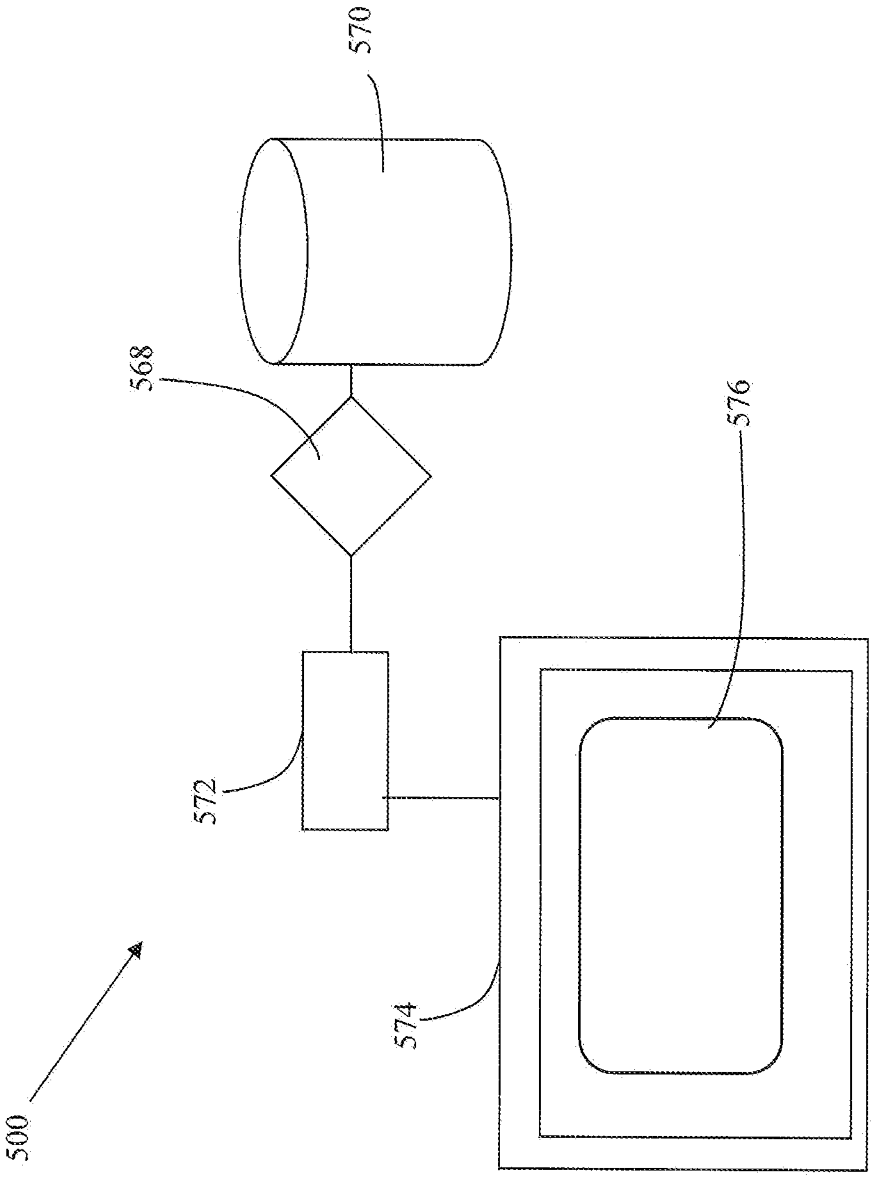
FIG. 5 is a schematic diagram depicting the components of an exemplary system configured and constructed according to some embodiments of the invention.

FIG. 5 illustrates a diagram of an exemplary system 500, which may be a portable device, constructed in accordance with some embodiments of the invention. System 500 includes processing device 568 in communication with a database or memory device 570, communication or data input/output device 572 and a display device 574. In some embodiments, display device 574 is a touch-enabled device and includes a data input device component. Memory device 570 may include data relating to the underlying game and embodiments of the invention as described herein, such as the side wager criteria. A player interface 576 can be presented on display device 574. Player interface 576 may be a virtual representation of a game table layout and/or one or more player positions for facilitating the transmittal and receipt of wagers in accordance with any of the embodiments herein, such as the embodiments of the invention described herein. Game outcomes are displayed and wagers are tracked using display device 574 and processing device 568 compares the respective player and banker hands, including the associated hands as described above and any bonus criteria, and determines an outcome and payout to be displayed on display device 574 accordingly.

Figure 6:
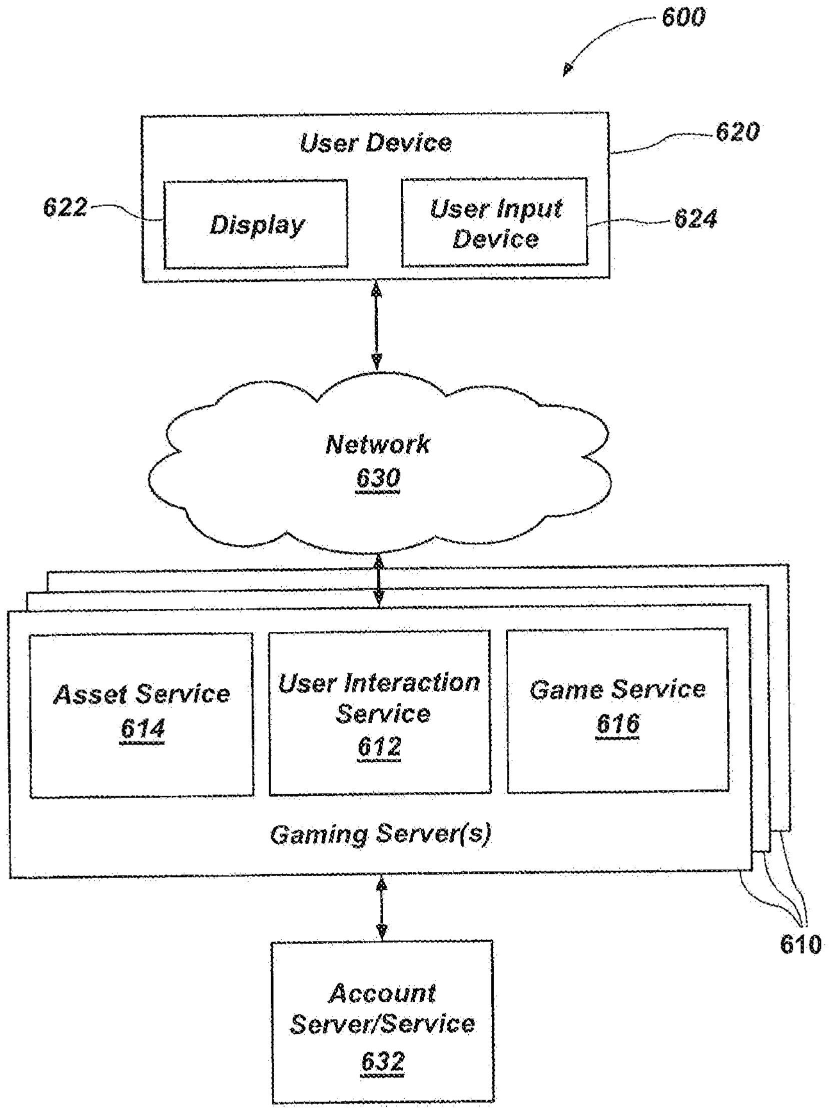
FIG. 6 is a schematic block diagram of a gaming system for implementing embodiments of waging games in accordance with this disclosure.

In some embodiments, wagering games in accordance with this disclosure may be administered using a gaming system employing a client-server architecture (e.g., over the Internet, a local area network, etc.). FIG. 6 is a schematic block diagram of an exemplary gaming system 600 for implementing wagering games so that end users may remotely access games as described herein, among others.

The wagering games of the invention supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This feature may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 600 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform to establish a portal for an end user to access a wagering game hosted by one or more gaming servers 610 over a network 630. In embodiments, games are accessed through a user interaction service 612. The gaming system 600 enables players to interact with a user device 620 through a user input device 624 and a display 622 and to communicate with one or more gaming servers 610 using a network 630 (e.g., the Internet). Typically the user device is remote from the gaming server 610 and the network is the word-wide web (i.e., internet).

In some embodiments, the gaming servers 610 may be configured as a single server to administer wagering games in combination with the user device 620. In other embodiments, the gaming servers 610 may be configured as separate servers for performing separate, dedicated functions associated with administering wagering games. Accordingly, the following description also discusses "services" with the understanding that the various services may be performed by different servers or combinations of servers in different embodiments. As shown in FIG. 6, the gaming servers 610 may include a user interaction service 612, a game service 616, and an asset service 614. In some embodiments, one or more of the gaming servers 610 may communicate with an account server 632 performing an account service 632. As explained more fully below, for some wagering type games, the account service 632 may be separate and operated by a different entity than the gaming servers 610; however, in some embodiments the account service 632 may also be operated one or more of the gaming servers 610.

The user device 620 may communicate with the user interaction service 612 through the network 630. The user interaction service 612 may communicate with the game service 616 and provide game information to the user device 620. In some embodiments, the game service 616 may also include a game engine. The game engine may comprise game rules. In some embodiments, a single user device 620 communicates with a game provided by the game service 616, while other embodiments may include a plurality of user devices 620 configured to communicate and provide end users with access to the same game provided by the game service 616. In addition, a plurality of end users may be permitted to access a single user interaction service 612, or a plurality of user interaction services 612, to access the game service 616. The user interaction service 612 may enable a user to create and access a user account and interact with game service 616. The user interaction service 612 may enable users to initiate new games, join existing games, and interface with games being played by the user.

The user interaction service 612 may also provide a client for execution on the user device 620 for accessing the gaming servers 610. The client provided by the gaming servers 610 for execution on the user device 620 may be any of a variety of implementations depending on the user device 620 and method of communication with the gaming servers 610. In one embodiment, the user device 620 may connect to the gaming servers 610 using a web browser, and the client may execute within a browser window or frame of the web browser. In another embodiment, the client may be a stand-alone executable on the user device 620.

For example, the client may comprise a relatively small amount of script, also referred to as a "script driver," including scripting language that controls an interface of the client. The script driver may include simple function calls requesting information from the gaming servers 610. In other words, the script driver stored in the client may merely include calls to functions that are externally defined by, and executed by, the gaming servers 610. As a result, the client may be characterized as a "thin client." The client may simply send requests to the gaming servers 610 rather than performing logic itself. The client may receive player inputs, and the player inputs may be passed to the gaming servers 610 for processing and executing the wagering game. In some embodiments, this may involve providing specific graphical display information for the display 622 as well as game outcomes.

As another example, the client may comprise an executable file rather than a script. The client may do more local processing than does a script driver, such as calculating where to show what game symbols upon receiving a game outcome from the game service 616 through user interaction service 612. In some embodiments, portions of an asset service 614 may be loaded onto the client and may be used by the client in processing and updating graphical displays. Some form of data protection, such as end-to-end encryption, may be used when data is transported over the network 630. The network 630 may be any network, such as, for example, the Internet or a local area network.

The gaming servers 610 may include an asset service 614, which may host various media assets (e.g., text, audio, video, and image files) to send to the user device 620 for presenting the various wagering games to the end user. In other words, the assets presented to the end user may be stored separately from the user device 620. For example, the user device 620 requests the assets appropriate for the game played by the user; as another example, especially relating to thin clients, just those assets that are needed for a particular display event will be sent by the gaming servers 610, including as few as one asset. The user device 620 may call a function defined at the user interaction service 612 or asset service 614, which may determine which assets are to be delivered to the user device 620 as well as how the assets are to be presented by the user device 620 to the end user. Different assets may correspond to the various user devices 620 and their clients that may have access to the game service 616 and to different variations of wagering games.

The gaming servers 610 may include the game service 616, which may be programmed to administer wagering games and determine game play outcomes to provide to the user interaction service 612 for transmission to the user device 620. For example, the game service 616 may include game rules for one or more wagering games, such that the game service 616 controls some or all of the game flow for a selected wagering game as well as the determined game outcomes. The game service 616 may include pay tables and other game logic. The game service 616 may perform random number generation for determining random game elements of the wagering game. In one embodiment, the game service 616 may be separated from the user interaction service 612 by a firewall or other method of preventing unauthorized access to the game service 612 by the general members of the network 630.

The user device 620 may present a gaming interface to the player and communicate the user interaction from the user input device 624 to the gaming servers 610. The user device 620 may be any electronic system capable of displaying gaming information, receiving user input, and communicating the user input to the gaming servers 610. For example, the user device 620 may be a desktop computer, a laptop, a tablet computer, a set-top box, a mobile device (e.g., a smartphone), a kiosk, a terminal, or another computing device. As a specific, non-limiting example, the user device 620 operating the client may be an interactive electronic gaming system 300 (see FIG. 3) or portable system 500 (see FIG. 5), as described above. The client may be a specialized application or may be executed within a generalized application capable of interpreting instructions from an interactive gaming system, such as a web browser.

The client may interface with an end user through a web page or an application that runs on a device including, but not limited to, a smartphone, a tablet, or a general computer, or the client may be any other computer program configurable to access the gaming servers 610. The client may be illustrated within a casino webpage (or other interface) indicating that the client is embedded into a webpage, which is supported by a web browser executing on the user device 620.

In some embodiments, components of the gaming system 600 may be operated by different entities. For example, the user device 620 may be operated by a third party, such as a casino or an individual, that links to the gaming servers 610, which may be operated, for example, by a wagering game service provider. Therefore, in some embodiments, the user device 620 and client may be operated by a different administrator than the operator of the game service 616. In other words, the user device 620 may be part of a third-party system that does not administer or otherwise control the gaming servers 610 or game service 616. In other embodiments, the user interaction service 612 and asset service 614 may be operated by a third-party system. For example, a gaming entity (e.g., a casino) may operate the user interaction service 612, user device 620, or combination thereof to provide its customers access to game content managed by a different entity that may control the game service 616, amongst other functionality. In still other embodiments, all functions may be operated by the same administrator. For example, a gaming entity may elect to perform each of these functions in-house, such as providing access to the user device 620, delivering the actual game content, and administering the gaming system 600.

The gaming servers 610 may communicate with one or more external account servers 632 (also referred to herein as an account service 632), optionally through another firewall. For example, the gaming servers 610 may not directly accept wagers or issue payouts. That is, the gaming servers 610 may facilitate online casino gaming but may not be part of a self-contained online casino itself. Another entity (e.g., a casino or any account holder or financial system of record) may operate and maintain its external account service 632 to accept bets and make payout distributions. The gaming servers 610 may communicate with the account service 632 to verify the existence of funds for wagering and to instruct the account service 632 to execute debits and credits. As another example, the gaming servers 610 may directly accept bets and make payout distributions, such as in the case where an administrator of the gaming servers 610 operates as a casino.

Additional features may be supported by the gaming servers 610, such as hacking and cheating detection, data storage and archival, metrics generation, messages generation, output formatting for different end user devices, as well as other features and operations.

Figure 7:
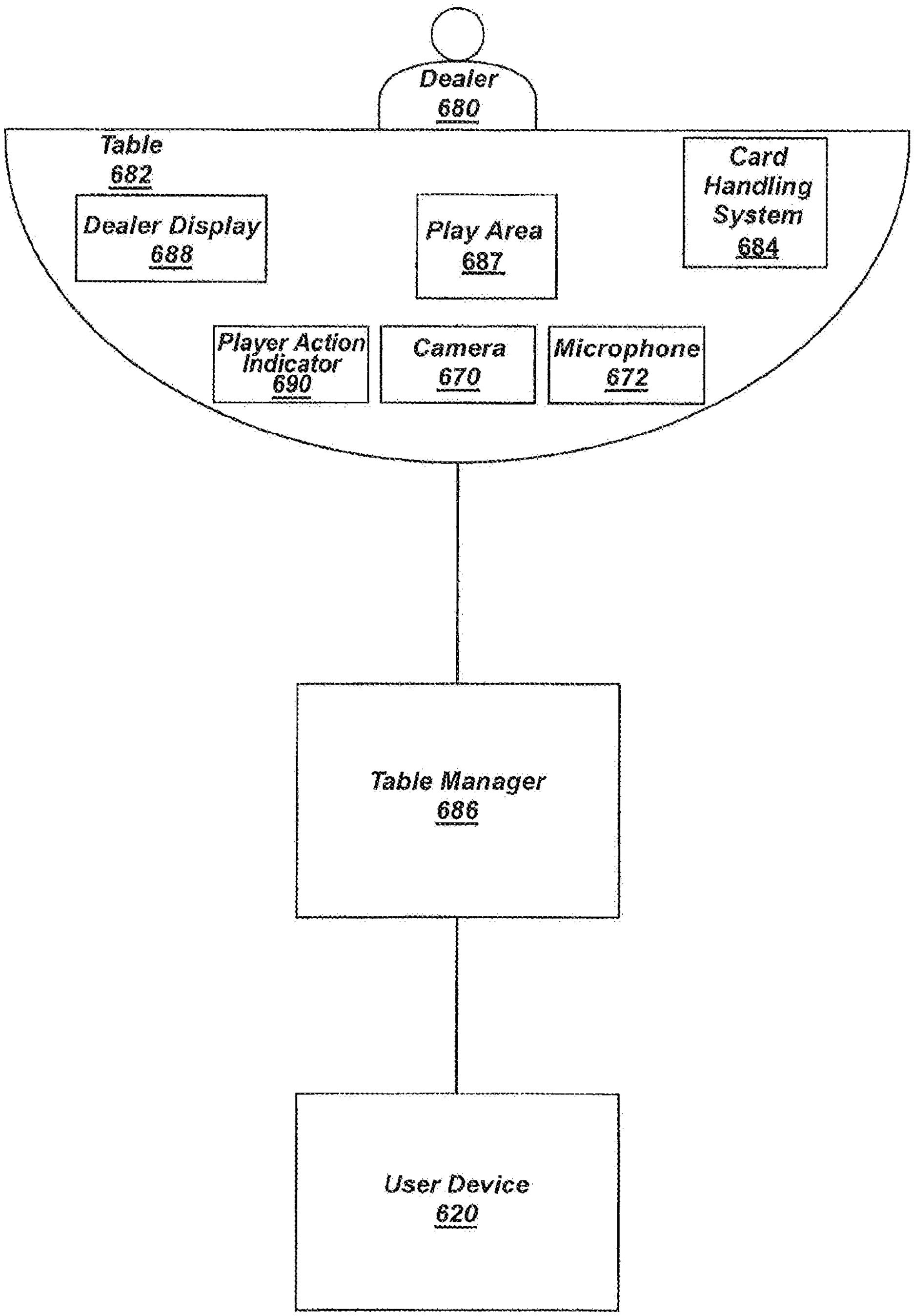
FIG. 7 is a schematic block diagram of a gaming system for implementing embodiments of wagering games including a live dealer feed.

FIG. 7 is a schematic block diagram of a table 682 for implementing wagering games including a live dealer feed. Features of the gaming system 600 described above in connection with FIG. 6 may be utilized in connection with this embodiment, except as further described. Rather than cards being determined by a computerized random processes, physical cards (e.g., from a standard, 52-card deck of playing cards) may be dealt by a live dealer 680 at a table 682 from a card handling system 684. A table manager 686 may assist the dealer 680 in facilitating play of the game by transmitting a video feed of the dealer's actions to the user device 620 and transmitting player elections to the dealer 680. As described above, the table manager 686 may act as or communicate with a gaming system 600 itself or as an intermediate client interposed between and operationally connected to the user device 620 and the gaming system 600 to provide gaming at the table 682 to users of the gaming system 600. Thus, the table manager 686 may communicate with the user device 620 through network 630, and may be a part of a larger online casino, or may be operated as a separate system facilitating game play. In various embodiments, each table 682 may be managed by an individual table manager 686 constituting a gaming device, which may receive and process information relating to that table. For simplicity of description, these functions are described as being performed by the table manager 686, though certain functions may be performed by an intermediary gaming system 600, such as the one shown and described in connection with FIG. 6. In some embodiments, the gaming system 600 may match remotely located players to tables 682 and facilitate transfer of information between user devices 620 and tables 682, such as wagering amounts and player option elections, without managing gameplay at individual tables. In other embodiments, functions of the table manager 686 may be incorporated into a gaming system 600.

The table 682 includes a camera 670 and optionally a microphone 672 to capture video and audio feeds relating to the table 682. The camera 670 may be trained on the dealer 680, play area 687, and card handling system 684. As the game is administered by the dealer 680, the video feed captured by the camera 670 may be shown to the player using the user device 620, and any audio captured by the microphone 672 may be played to the player using the user device 620. In some embodiments, the user device 620 may also include a camera, microphone, or both, which may also capture feeds to be shared with the dealer 680 and other players. In some embodiments, the camera 670 may be trained to capture images of the card faces, chips, and chip stacks on the surface of the gaming table and perform card recognition routines to identify the card rank and suit, which is well known in the art.

Card and wager data in some embodiments may be used by the table manger 686 to determine game outcome. The data extracted from the camera 670 may be used to confirm the card data obtained from the card handling system 684, to determine a player position that received a card, and for general security monitoring purposes.

The live video feed permits the dealer to show cards dealt by the card handling system and play the game as though the player were at a live casino. In addition, the dealer can prompt a user by announcing a player's election is to be performed. In embodiments in which a microphone 672 is included, the dealer 680 can verbally announce action or request an election by a player. In some embodiments, the user device 620 also includes a camera or microphone, which also captures feeds to be shared with the dealer 680 and other players.

The play area 687 may depict one or more player positions for playing the game. As determined by the rules of the game, the player at the user device 620 may be presented options for responding to an event in the game using a client as described with reference to FIG. 6.

Player selections may be transmitted to the table manager 686, which may display player elections to the dealer 680 using a dealer display 688 and player action indicator 690 on the table 682. For example, the dealer display 688 may display information regarding where to deal the next card or which player position is responsible for the next action.

In some embodiments, the table manager 686 may receive card information from the card handling system 684 to identify cards dealt by the card handling system 684. For example, the card handling system 684 may include a card reader to determine card information from the cards. The card information may include the rank and suit of each dealt card, and/or hand information.

The table manager 686 may apply game rules to the card information, along with the accepted player decisions, to determine gameplay events and wager results. Alternatively, the wager results may be determined by the dealer 680 and input to the table manager 686, which may be used to confirm automatically determined results by the gaming system.

Figure 8:
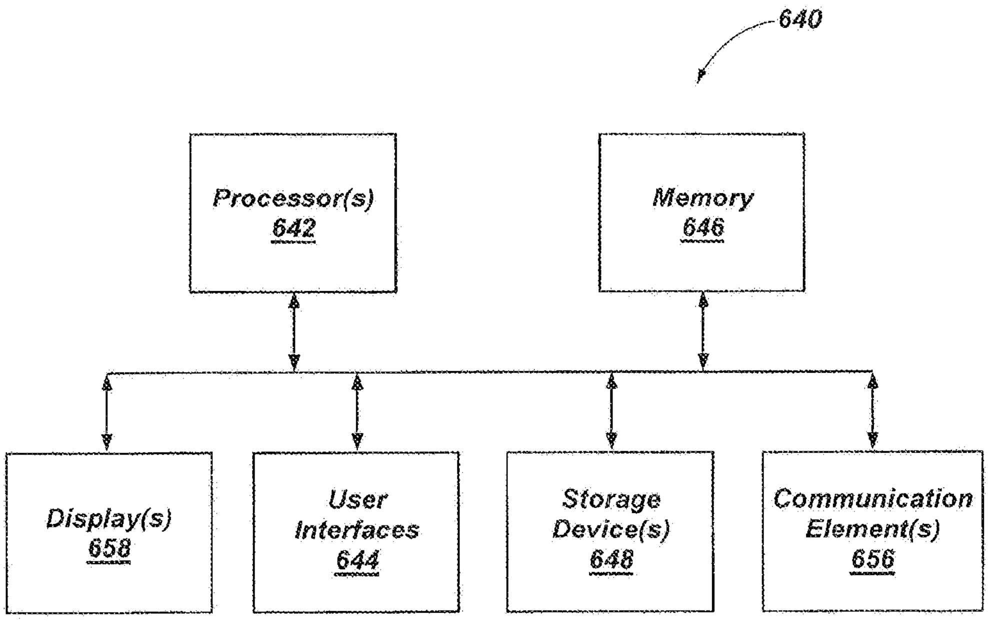
FIG. 8 is a block diagram of a computer for acting as a gaming system for implementing embodiments of wagering games in accordance with this disclosure.

FIG. 8 is a simplified block diagram showing elements of computing devices that may be used in systems and apparatuses of this disclosure. The computing system 640 may be a user-type computer, a file server, a computer server, a notebook computer, a tablet, a handheld device, a mobile device, or other similar computer system for executing software. The computing system 640 may be configured to execute software programs containing computing instructions and may include one or more processors 642, memory 646, one or more displays 658, one or more user interface elements 644, one or more communication elements 656, and one or more storage devices 648 (also referred to herein simply as storage 648).

The processors 642 may be configured to execute a wide variety of operating systems and applications including the computing instructions for administering wagering games of the present disclosure.

The memory 646 may be used to hold computing instructions, data, and other information for performing a wide variety of tasks including administering wagering games of the present disclosure. By way of example, and not limitation, the memory646 may include Synchronous Random Access Memory (SRAM), Dynamic RAM (DRAM), Read-Only Memory (ROM), Flash memory, and the like.

The display 658 may be a wide variety of displays such as, for example, light emitting diode displays, liquid crystal displays, cathode ray tubes, and the like. In addition, the display 658 may be configured with a touch-screen feature for accepting user input as a user interface element 644.

As non-limiting examples, the user interface elements 644 may include elements such as displays, keyboards, push buttons, mice, joysticks, haptic devices, microphones, speakers, cameras, and touchscreens.

As non-limiting examples, the communication elements 656 may be configured for communicating with other devices or communication networks. As non-limiting examples, the communication elements 656 may include elements for communicating on wired and wireless communication media, such as for example, serial ports, parallel ports, Ethernet connections, universal serial bus (USB) connections, IEEE 1394 ("firewire") connections, Thunderbolt™ connections, Bluetooth® wireless networks, ZigBee wireless networks, 802.11 type wireless networks, cellular telephone/data networks, and other suitable communication interfaces and protocols.

The storage 648 may be used for storing relatively large amounts of nonvolatile information for use in the computing system 640 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 640 may be configured in many different ways with different types of interconnecting buses between the various elements. Moreover, the various elements may be subdivided physically, functionally, or a combination thereof. As one non-limiting example, the memory 646 may be divided into cache memory, graphics memory, and main memory. Each of these memories may communicate directly or indirectly with the one or more processors 642 on separate buses, partially-combined buses, or a common bus.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality. However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," "determining," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention may include other examples that occur to those skilled in the art. Other aspects and features of the invention can be obtained from a study of the drawings and the disclosure. The invention may be practiced otherwise than as specifically described herein. It should also be noted, that the steps and/or functions listed herein, notwithstanding the order of which steps and/or functions are listed, are not limited to any specific order of operation.

Those skilled in the art will readily appreciate that the systems and methods described herein may be a standalone system, gaming device, gaming machine or incorporated in an existing gaming system or machine. The system and gaming device of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A method for implementing a secure wagering game, the method comprising:

providing a specialized physical gaming table, the specialized physical gaming table having thereon a discrete first wagering area corresponding to placement of a first wager, a discrete second wagering area corresponding to placement of an additional wager on a player hand, a first discrete player hand area corresponding to placement of the player hand, a second discrete dealer hand area corresponding to placement of the dealer hand, and a third discrete community group area corresponding to placement of a community group, and a discrete paytable area corresponding to a paytable, wherein each of the first wagering area, the second wagering area, the player hand area, the dealer hand area, the community group area and the paytable area are different from each other and correspond to different areas of the specialized physical gaming table;

providing at least one physical deck of cards, each card of the at least one physical deck of cards having at least a suit from a plurality of suits;

providing the paytable in the paytable area, the paytable including a plurality of numbers of cards of a specific suit and a respective payout for each number of cards of the specific suit from the plurality of numbers of cards of the specific suit; and using the specialized physical gaming table, the at least one physical deck of cards, and the paytable to implement the secure wagering game comprising:

receiving from a player using a physical gaming chip having a first monetary value, the first wager in the first wagering area;

responsive to the first wager being received in the first wagering area:

(i) dealing, into the player hand area and from the at least one physical deck of cards, a plurality of cards corresponding to the player hand;

(ii) dealing, into the dealer hand area and from the at least one physical deck of cards, a plurality of cards corresponding to the dealer hand, wherein the plurality of cards in the dealer hand are dealt with each card value of the plurality of cards in the dealer hand being hidden; and (iii) dealing, into the community group area and from the at least one physical deck of cards, a plurality of cards corresponding to the community group, wherein the plurality of cards in the community group are dealt with each card value of the plurality cards in the community group being hidden; and conducting one or more game events, wherein the card value of one or more cards of the plurality of cards in the community group are displayed in each of the one or more game events;

receiving from the player using the physical gaming chips in at least one of the one or more game events, the additional wager in the second wagering area, wherein the additional wager has one of the first monetary value or the second monetary value;

determining at the preset specialized physical gaming table:

(i) a best possible ranked final player hand, the final player hand being formed from card values of a first preset number of cards in the player hand and a second preset number of card values from the one or more cards displayed in the community group; and (ii) a best possible ranked final dealer hand, the final dealer hand being formed from card values of the first preset number of cards in the dealer hand and the second preset number of card values from the one or more cards displayed community group; and distributing a payout responsive to determining the final player hand outranking the final dealer hand.

2. The method of claim 1, wherein the first preset number and second preset number are different.

3. The method of claim 1, wherein the player hand and dealer hand each include four playing cards.

4. The method of claim 1, wherein the first preset number is half of the plurality of cards in the player hand.

5. The method of claim 1, wherein the second preset number is greater than half of the plurality of cards in the community group.

* * * * *